(12) United States Patent
Dees et al.

(10) Patent No.: US 11,254,412 B2
(45) Date of Patent: Feb. 22, 2022

(54) FOLDABLE RAKED WING TIPS HAVING AERODYNAMIC DEVICES

(71) Applicant: The Boeing Company, Chicago, IL (US)

(72) Inventors: Paul W. Dees, Snohomish, WA (US); Bruce R. Detert, Seattle, WA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 16/369,439

(22) Filed: Mar. 29, 2019

(65) Prior Publication Data
US 2020/0307761 A1 Oct. 1, 2020

(51) Int. Cl.
*B64C 3/54* (2006.01)

(52) U.S. Cl.
CPC .................................. *B64C 3/546* (2013.01)

(58) Field of Classification Search
CPC .................................................... B64C 3/546
See application file for complete search history.

(56) References Cited

U.S. PATENT DOCUMENTS

| | | | |
|---|---|---|---|
| 1,841,921 A * | 1/1932 | Spiegel | B64C 23/069 244/199.4 |
| 2,289,224 A | 7/1942 | Swanson et al. | |
| 2,290,850 A | 7/1942 | Umschiweif | |
| 2,418,301 A | 4/1947 | Heal | |
| 2,719,682 A | 10/1955 | Handel | |
| 4,247,062 A | 1/1981 | Brueckner | |
| 4,722,499 A * | 2/1988 | Klug | B64C 23/076 244/199.4 |
| 4,778,129 A | 10/1988 | Byford | |
| 4,824,053 A | 4/1989 | Sarh | |
| 5,072,894 A | 12/1991 | Cichy | |
| 5,201,479 A | 4/1993 | Renzelmann | |
| 5,310,138 A | 5/1994 | Fitzgibbon | |
| 5,350,135 A | 9/1994 | Renzelmann et al. | |
| 5,381,986 A | 1/1995 | Smith et al. | |
| 5,452,643 A | 9/1995 | Smith et al. | |
| 5,558,299 A | 9/1996 | Veile | |

(Continued)

FOREIGN PATENT DOCUMENTS

DE 2149956 4/1973
DE 199 26 832 A1 1/2001

(Continued)

OTHER PUBLICATIONS

European Patent Office, "Extended European Search Report," issued in connection with European Patent Application No. 20166448.9, dated Sep. 4, 2020, 8 pages.

(Continued)

*Primary Examiner* — Justin M Benedik
(74) *Attorney, Agent, or Firm* — Hanley, Flight & Zimmerman, LLC

(57) ABSTRACT

Foldable raked wing tips having aerodynamic devices are disclosed. A disclosed example wing for use with an aircraft includes a fixed portion, and a folding portion proximate a distal end of the wing. The folding portion includes a raked surface. The wing also includes at least one of a feather or a winglet, and a hinge operatively coupled between the fixed and folding portions to enable the folding portion to fold relative to the fixed portion.

22 Claims, 6 Drawing Sheets

(56) References Cited

U.S. PATENT DOCUMENTS

| | | | |
|---|---|---|---|
| 5,634,613 | A | 6/1997 | McCarthy |
| 6,082,665 | A | 7/2000 | Spitzer |
| 6,089,502 | A | 7/2000 | Herrick et al. |
| 6,345,790 | B1 * | 2/2002 | Brix ................ B64C 23/076 244/199.4 |
| 6,834,835 | B1 | 12/2004 | Knowles et al. |
| 7,275,722 | B2 * | 10/2007 | Irving ............... B64C 23/072 244/201 |
| 7,744,038 | B2 * | 6/2010 | Sankrithi ........... B64C 23/076 244/199.4 |
| 8,342,447 | B2 | 1/2013 | Etling |
| 8,733,692 | B2 | 5/2014 | Kordel et al. |
| 8,777,153 | B2 | 7/2014 | Parker |
| 9,045,217 | B2 | 6/2015 | Kordel et al. |
| 9,047,771 | B1 | 6/2015 | Thoreen et al. |
| 9,211,946 | B2 | 12/2015 | Good et al. |
| 9,290,260 | B2 | 3/2016 | Lassen et al. |
| 9,296,469 | B2 | 3/2016 | Santini et al. |
| 9,296,472 | B2 | 3/2016 | Thoreen et al. |
| 9,415,857 | B2 | 8/2016 | Fox et al. |
| 9,440,730 | B2 | 9/2016 | Kordel et al. |
| 9,469,392 | B2 | 10/2016 | Fox et al. |
| 9,481,446 | B2 | 11/2016 | Lassen et al. |
| 9,499,252 | B2 * | 11/2016 | Lassen ................ B64C 3/56 |
| 9,580,166 | B2 | 2/2017 | Good et al. |
| 9,783,284 | B2 | 10/2017 | Townsend et al. |
| 9,873,502 | B2 * | 1/2018 | Good ................. B64C 3/56 |
| 9,908,612 | B2 | 3/2018 | Fox |
| 9,914,523 | B2 | 3/2018 | Good et al. |
| 9,914,524 | B2 | 3/2018 | Good et al. |
| 9,919,809 | B2 | 3/2018 | Moy et al. |
| 9,932,107 | B2 | 4/2018 | Good et al. |
| 9,950,780 | B2 | 4/2018 | Santini et al. |
| 9,950,810 | B2 | 4/2018 | Thoreen et al. |
| 9,957,831 | B2 | 5/2018 | Soman et al. |
| 10,106,244 | B2 | 10/2018 | Good et al. |
| 10,156,439 | B2 | 12/2018 | Fay et al. |
| 10,173,766 | B2 | 1/2019 | Good et al. |
| 10,215,281 | B2 | 2/2019 | Soman et al. |
| 10,343,763 | B2 * | 7/2019 | Cross ................. F04D 29/38 |
| 2004/0000619 | A1 * | 1/2004 | Barriety ............. B64C 3/52 244/219 |
| 2008/0191099 | A1 | 8/2008 | Werthmann et al. |
| 2009/0039204 | A1 * | 2/2009 | Eberhardt .......... B64C 23/069 244/199.4 |
| 2009/0084904 | A1 * | 4/2009 | Detert ............... B64C 23/065 244/199.4 |
| 2009/0302159 | A1 | 12/2009 | Pajard |
| 2010/0084516 | A1 | 4/2010 | Eberhardt |
| 2011/0180657 | A1 | 7/2011 | Gionta et al. |
| 2013/0099060 | A1 * | 4/2013 | Dees ................. B64C 3/56 244/199.4 |
| 2015/0360770 | A1 * | 12/2015 | Good ................. B64D 45/0005 244/199.3 |
| 2016/0176504 | A1 | 6/2016 | Lassen et al. |
| 2016/0362171 | A1 | 12/2016 | Lassen et al. |
| 2017/0029094 | A1 | 2/2017 | Lynas et al. |
| 2017/0066521 | A1 | 3/2017 | Fox et al. |
| 2017/0152017 | A1 * | 6/2017 | Good ................. B64C 3/56 |
| 2018/0105256 | A1 | 4/2018 | Good et al. |
| 2018/0170516 | A1 * | 6/2018 | Niemiec ............ B64C 3/546 |
| 2019/0023373 | A1 * | 1/2019 | Cline ................ B64C 3/56 |

FOREIGN PATENT DOCUMENTS

| | | |
|---|---|---|
| EP | 1375342 | 1/2004 |
| EP | 1531126 | 5/2005 |
| EP | 0988225 | 10/2006 |
| EP | 2650212 | 10/2013 |
| EP | 2727826 | 5/2014 |
| GB | 481050 | 3/1938 |
| GB | 2454588 | 5/2009 |
| GB | WO2015162399 | * 10/2015 |
| GB | 2560900 | 10/2018 |
| GB | 2565082 | 2/2019 |
| WO | 2011051699 | 5/2011 |
| WO | 2011070532 | 6/2011 |
| WO | 2012007358 | 1/2012 |
| WO | 2015162399 | 10/2015 |

OTHER PUBLICATIONS

United States Patent and Trademark Office, "Final Office action," issued in connection with U.S. Appl. No. 11/866,209, dated Nov. 10, 2010, 9 pages.

McLean, "Wingtip Devices: What They Do and How They Do it," 2005 Performance and Flight Operations Engineering Conference, (2005), 20 pages.

United States Patent and Trademark Office, "Restriction Requirement," issued in connection with U.S. Appl. No. 13/664,416, dated Feb. 12, 2015, 6 pages.

United States Patent and Trademark Office, "Non-Final Office action," issued in connection with U.S. Appl. No. 13/664,416, dated May 26, 2015, 16 pages.

United States Patent and Trademark Office, "Final Office action," issued in connection with U.S. Appl. No. 13/664,416, dated Mar. 4, 2016, 23 pages.

United States Patent and Trademark Office, "Non-Final Office action," issued in connection with U.S. Appl. No. 13/664,416, dated Oct. 10, 2018, 23 pages.

United States Patent and Trademark Office, "Final Office action," issued in connection with U.S. Appl. No. 13/664,416, dated Mar. 28, 2019, 25 pages.

United States Patent and Trademark Office, "Examiner's Answer," issued in connection with U.S. Appl. No. 13/664,416, dated Nov. 25, 2016, 7 pages.

United States Patent and Trademark Office, "Notice of Panel Decision from Pre-Appeal Brief Review," Issued in connection with U.S. Appl. No. 13/664,416, dated Jul. 28, 2016, 2 pages.

European Patent Office, "Extended European Search Report," issued in connection with European Application No. 13179824.1, dated Sep. 22, 2015, 6 pages.

European Patent Office, "Communication pursuant to Article 94(3) EPC," issued in connection with European Application No. 13179824. 1, dated Apr. 11, 2018, 4 pages.

Canadian Intellectual Property Office, "Office Action," issued in connection with Canadian Application No. 2,824,108, dated Jun. 17, 2016, 4 pages. (English Translation Included.).

Japanese Patent Office, "Notice of Reasons for Rejection," issued in connection with Japanese Patent Application No. 2013-222971, dated Jul. 11, 2017, 18 pages (English Translation Included.).

Federal Institute of Industrial Property, "Office Action," issued in connection with Russian Patent Application No. 2013142688/11(065544), dated Sep. 7, 2017, 8 pages (English Translation Included.).

State Intellectual Property Office of PRC, "Notification of the Decision of Rejection," issued in connection with Chinese Application No. 201310495156.7, dated Feb. 14, 2018, 12 pages. (English Translation Included.).

European Patent Office, Office Action mailed in connection with Application No. 20 166 448.9, dated Aug. 20, 2021, 8 pages, Munich, Germany.

* cited by examiner of this disclosure.

FOLDABLE RAKED WING TIPS HAVING AERODYNAMIC DEVICES

FIELD OF THE DISCLOSURE

This disclosure relates generally to aircraft and, more particularly, to foldable raked wing tips having aerodynamic devices.

BACKGROUND

In recent years, foldable wings have been implemented onto aircraft to allow for wings with relatively long wing spans. In particular, during cruise, the relatively long wing spans can result in favorable aerodynamic characteristics, such as reduced drag and, thus, reduced fuel consumption. However, these wing spans can also reduce an ability of the aircraft to comply with span requirements of airports, buildings and/or maintenance areas (e.g., gates, runways, taxi ways, taxi lanes, maintenance facilities, etc.). To maintain span requirement compliance, some aircraft employ foldable wings in which a distal portion of a wing is rotated to reduce an effective span of the aircraft while the aircraft is on the ground. As a result, aircraft with extended wing spans that employ folding can still comply with the span requirements.

SUMMARY

An example wing for use with an aircraft includes a fixed portion, and a folding portion proximate a distal end of the wing. The folding portion includes a raked surface. The wing also includes at least one of a feather or a winglet, and a hinge operatively coupled between the fixed and folding portions to enable the folding portion to fold relative to the fixed portion.

An example aerodynamic structure of an aircraft includes a fixed portion including a first raked portion, and a folding portion including a second raked portion and at least one of a winglet or a feather. The aerodynamic structure also includes a hinge operatively coupling the fixed and foldable portions to enable the foldable portion to rotate relative to the fixed portion.

An example folding wing tip to be rotated relative to a fixed portion of a wing includes a raked portion extending along a lateral length of the folding wing tip, at least one of a winglet or a feather, and a hinge portion to be coupled to a hinge, where the hinge is to rotationally couple the folding wing tip to the fixed portion.

An example method includes coupling a folding portion proximate to a distal portion of a wing, where the folding portion includes a raked surface, and where at least one of the folding portion includes a winglet or at least one of the wing or the folding portion includes a feather.

Figure 1:
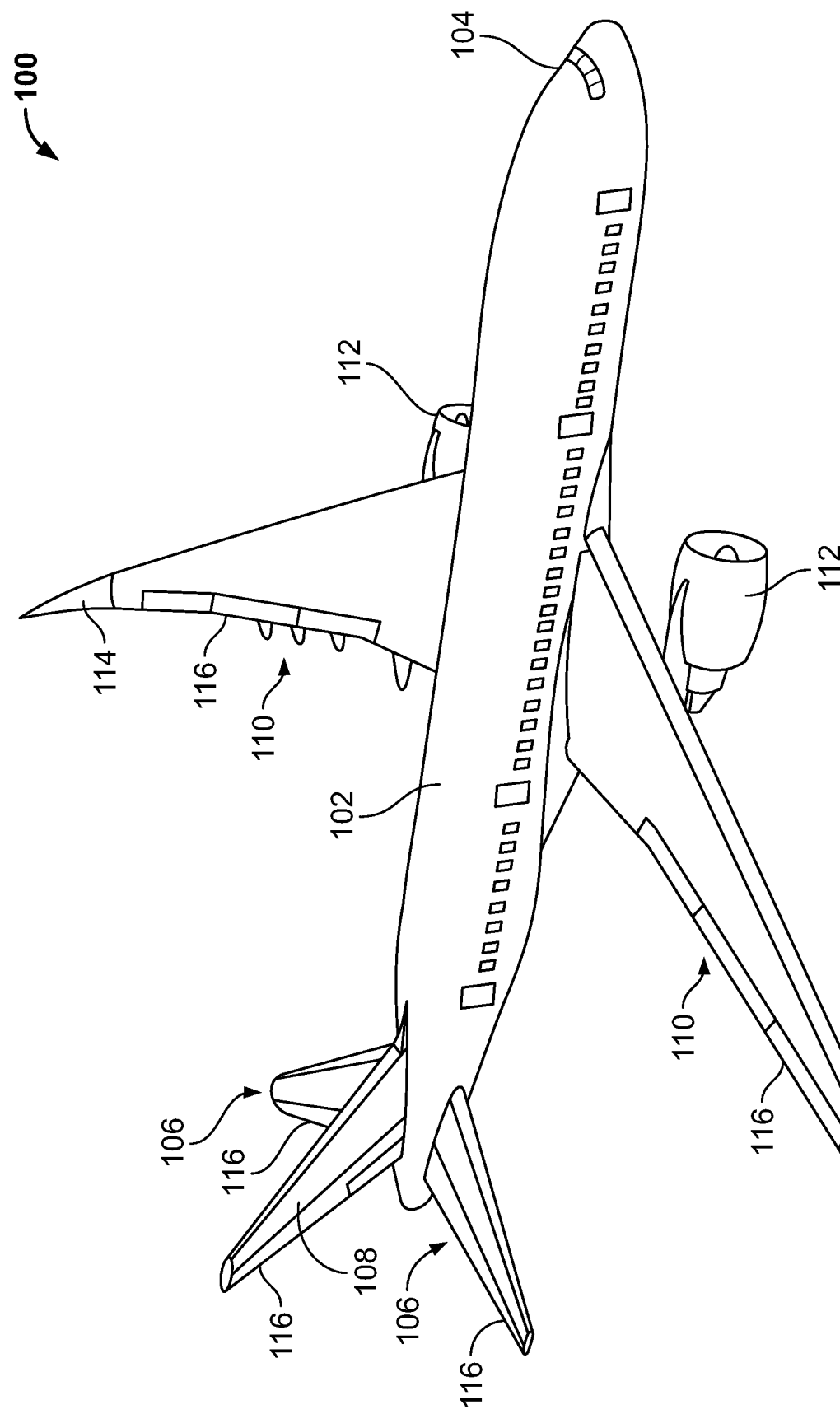
FIG. 1 depicts an example aircraft in which examples disclosed herein can be implemented.

The figures are not to scale. For example, lifting surface thicknesses depicted are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions (e.g., lifting surfaces) with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Foldable raked wing tips having aerodynamic devices are disclosed. Some aircraft employ folding portions (e.g., folding wing tips) for favorable aerodynamic properties while ensuring compliance with airport infrastructure requirements. For example, the folding portions at a distal end of wings of an aircraft fold upward to reduce an overall span of the aircraft to comply with the aforementioned infrastructure requirements.

Examples disclosed herein implement a foldable raked wing tip (e.g., a foldable wing tip having a raked surface, a raked portion, a raked exterior shape, etc.) with an aerodynamic device to improve aerodynamic properties of an aircraft. In particular, the foldable raked wing tip implements at least one of a winglet or a feather, for example, to reduce an overall drag of the aircraft with reduced weight impact(s), thereby enabling significant fuel savings. Further, because the aforementioned aerodynamic device can be generally implemented as a fixed, non-movable component, implementation of the aerodynamic device is relatively cost-effective. Further, the aforementioned aerodynamic devices can be produced and/or integrated on foldable wing tips with relative ease (e.g., relatively less complex integration).

In some examples, a raked portion of the foldable wing tip and at least one of a winglet or a feather mounted thereon are overlapping. In other words, in some such examples, the winglet and/or the feather are disposed on a raked portion or surface of the foldable wing tip. Additionally or alternatively, forward or aft feathers are implemented onto the foldable raked wing tip. In some examples, the foldable wing tip includes both a feather and a winglet.

As used herein, the terms "raked," "raked portion" and "raked surface" refer to geometries, surfaces, component shapes and/or exterior shapes exhibiting a raked curvature or a straight, swept planform shape. As used herein, the term "hinge" refers to a component, assembly and/or device used to enable rotational motion between two components. As used herein, the term "fixed portion" refers to a component, assembly and/or device that is generally fixed (i.e., translationally and rotationally fixed) and/or constrained to another component that may be moved, such as an aircraft fuselage, for example.

FIG. 1 depicts an example aircraft 100 in which examples disclosed herein can be implemented. The aircraft 100 of the illustrated example includes a fuselage 102 with a flight deck 104, stabilizers 106 and a fin 108. The example aircraft 100 also includes wings 110, both of which include a corresponding engine 112 mounted thereto. In this example, the wings 110 also include wing tips 114 located proximate distal ends of the wings 110. In this example, the wings 110, the stabilizers 106 and the fin 108 include respective control and high lift surfaces (e.g., movable control surfaces, etc.) 116.

In operation, the aircraft 100 is maneuvered in flight by movement of the control surfaces 116 in conjunction with thrust provided by the engines 112. In particular, rotational movement of the control surfaces 116 affects movement and/or orientation of the aircraft 100 during flight by causing airflow changes or gradients across the aircraft 100. During cruise of the aircraft 100, the control surfaces 116 are appropriately oriented and/or positioned to maintain a heading, trim, and overall aerodynamic performance of the aircraft 100. However, high drag can be encountered. Accordingly, to enhance aerodynamic performance of the aircraft 100, the wings 110 include a relatively long span that is wider than typically allowed in some airports. As will be discussed in greater detail below in connection with FIGS. 3A-5B, the wings 110 further include aerodynamic devices, such as winglets or feathers, for example, which are positioned at the wing tips 114 of the respective wings 110 for further aerodynamic performance enhancement. Accordingly, the wing tips 114 are folded relative to the wing 110 to reduce a wing span (e.g., an effective wing span) of the aircraft 100 (e.g., the wing tips 114 are folded while the aircraft 100 is on the ground).

Figure 2:
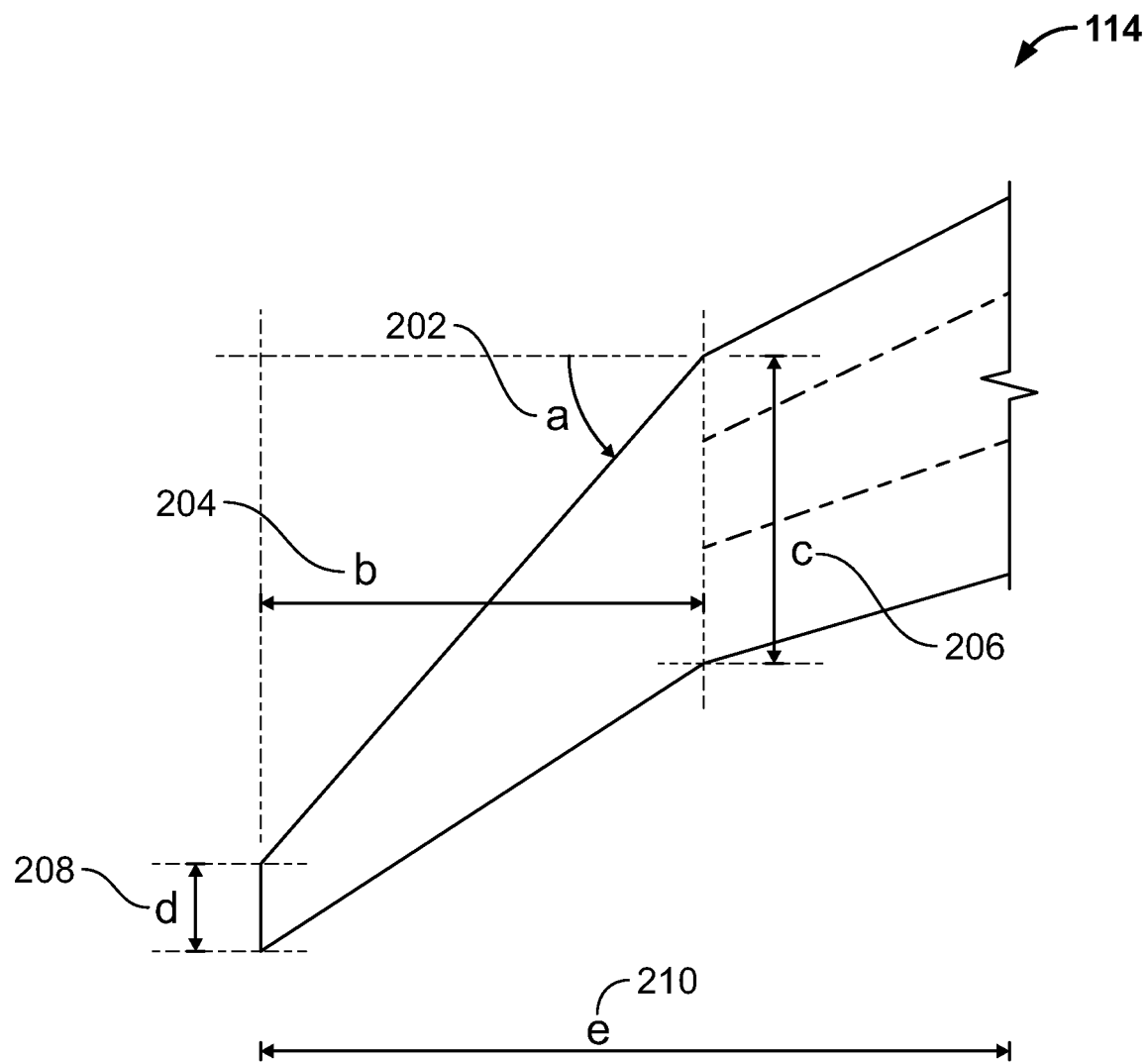
FIG. 2 is a top view of a wing tip of an example wing tip area of an aircraft of FIG. 1.
Figure 3:
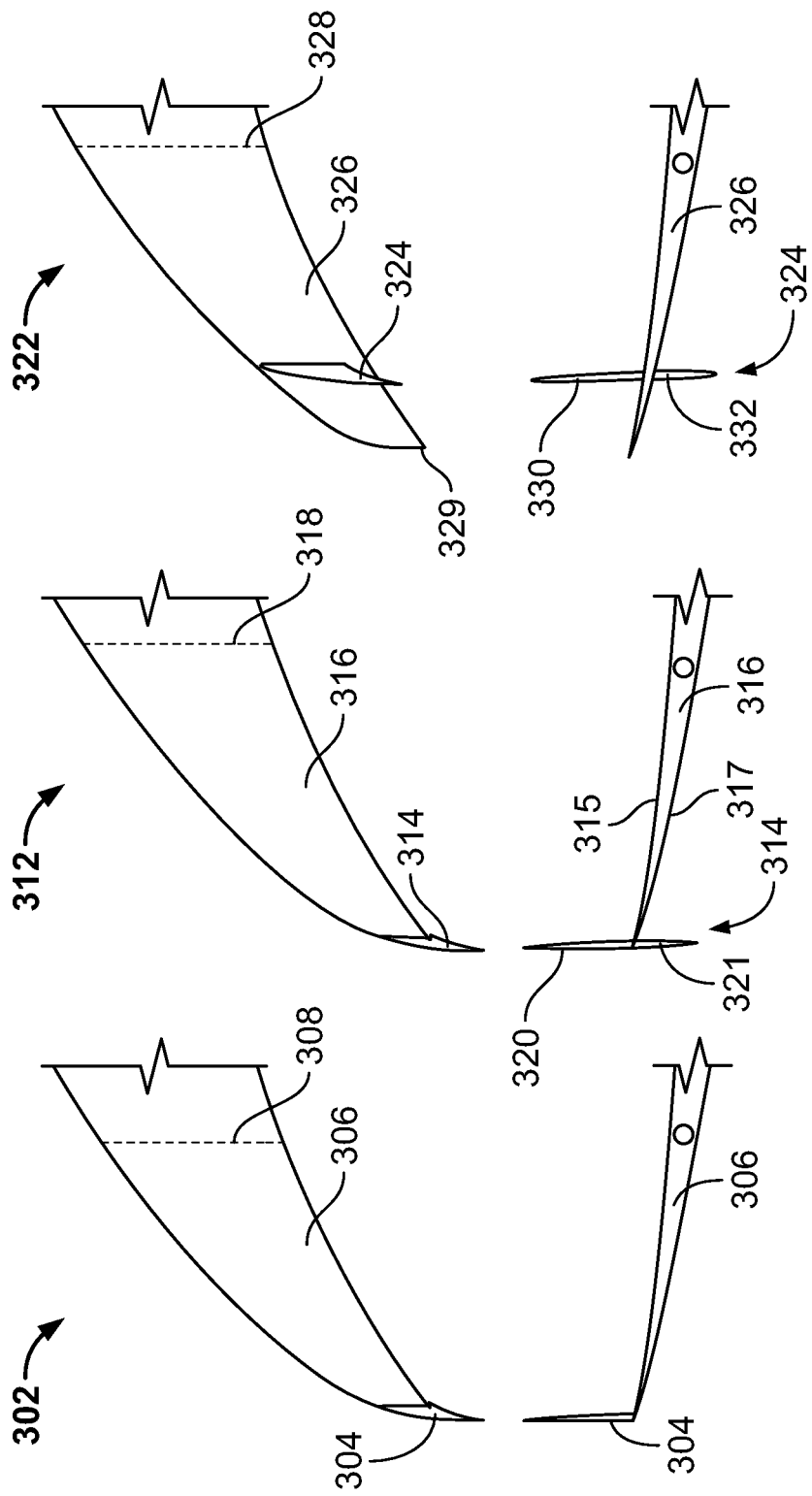
FIGS. 3A-3C depict example wing tips in accordance with the teachings of this disclosure.
Figure 4:
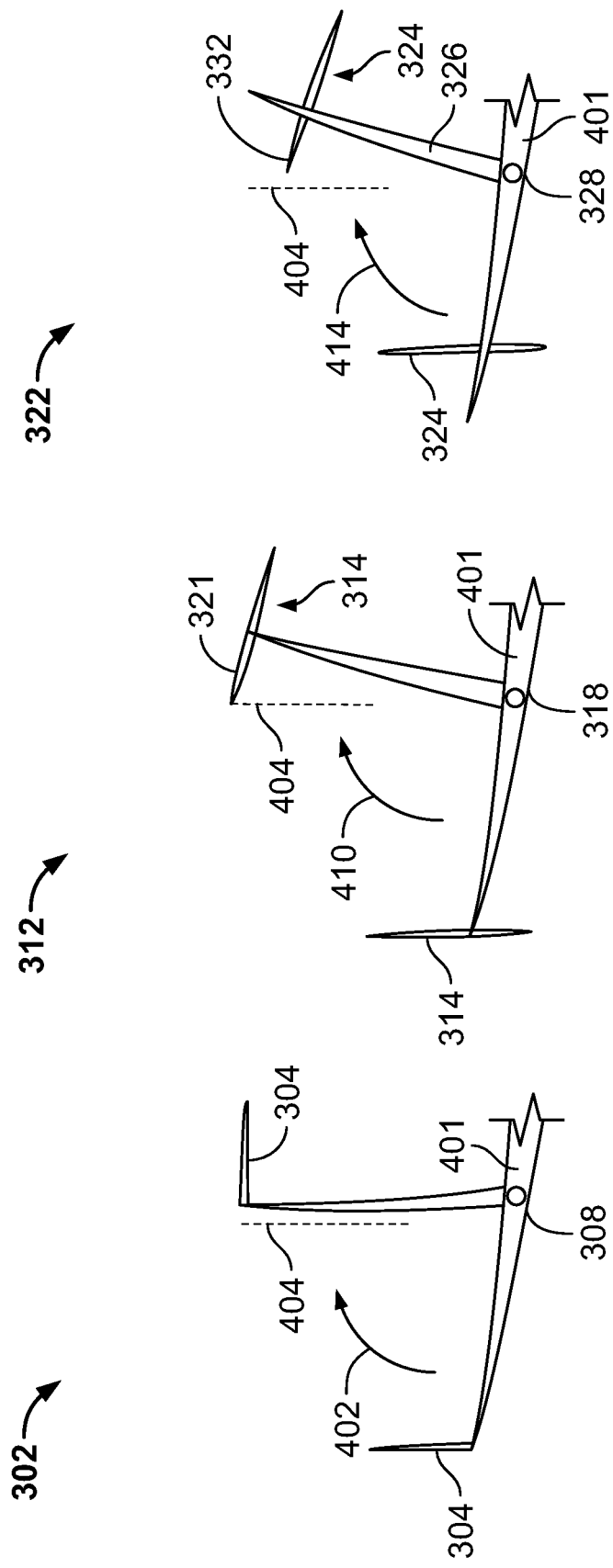
FIGS. 4A-4C depict folding of the example wing tips of FIGS. 3A-3C, respectively.
Figure 5:
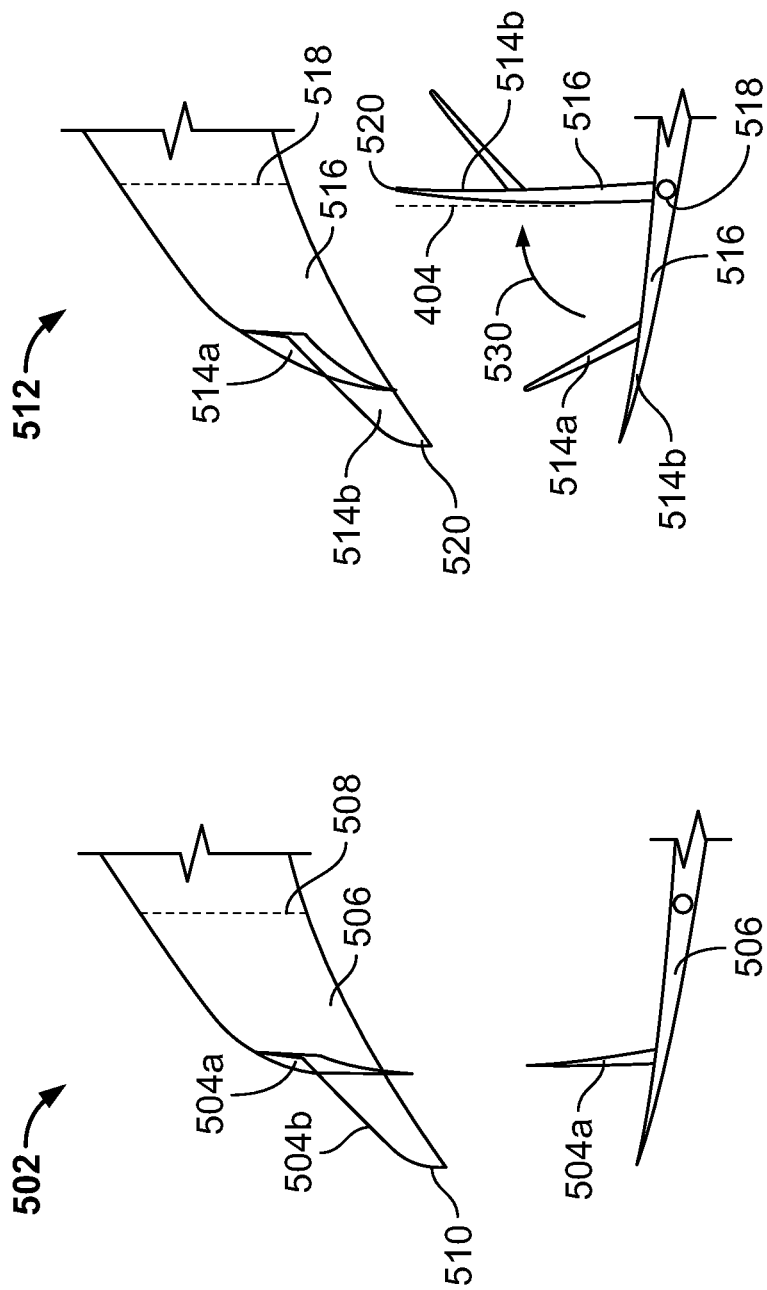
FIGS. 5A-5B depict further example wing tips in accordance with teachings of this disclosure.

FIG. 2 is a top view of the wing tip 114 of the example aircraft 100 of FIG. 1. In particular, the example wing tip 114 exhibits a raked shape and/or overall geometry. Accordingly, parameters described below in connection with FIG. 2 can be related to the example wing tip 114 or other aerodynamic features and/or components described herein. As can be seen in the illustrated example of FIG. 2, the wing tip 114 includes a leading edge sweep 202, which is designated by "a," and a semi-span 204, which is designated by "b." Further, the wing tip 114 has a root chord 206 designated by "c," a tip chord 208 designated by "d," and an overall span 210, which is designated by "e." Leading and trailing edge planform shapes of the wing tip 114 can be curved or straight.

For examples disclosed herein, parameters described below can be used to characterize features associated therewith. In this example, a planform area of both wing tips 114 can be calculated based on example Equation 1 below:

$$A\_Planform = b*(c+d) \quad (1)$$

Further, the aspect ratio of the wing tip 114 can be calculated by example Equation 2 below:

$$\text{Aspect Ratio} = \frac{(2*b)(2*b)}{(2*b*(c+d))} = \frac{2*b}{(c+d)} \quad (2)$$

Moreover, taper ratios (e.g., d/c in the example shown in FIG. 2) can be used in characterizing examples disclosed herein. However, any appropriate equations and/or mathematical relationships can be implemented instead.

In accordance with teachings of this disclosure, example raked wing tips can exhibit an aspect ratio approximately between 1.4 to 2.5 (e.g., 1.8). In some examples, a taper ratio can range between approximately 0.20 to 0.40 (e.g., 0.28). In some examples, the leading edge sweep is approximately 40 to 70 degrees (e.g., 55 degrees).

FIGS. 3A-3C depict example wing tips (e.g., folding portions, foldable raked wing tips, etc.) 302, 312, 322 in accordance with teachings of this disclosure. The wing tips 302, 312, 322 can be used to implement the wing tip 114 of FIG. 1. Turning to FIG. 3A, the example raked foldable wing tip 302 is shown in both top and frontal views (shown together for clarity). According to the illustrated example, the wing tip 302 includes a winglet (e.g., an up winglet) 304, which is implemented as an upwardly extending (in the frontal view of FIG. 3A) winglet. Further, the wing tip 302 includes a base portion 306 and a hinge (e.g., a hinge-mounted portion/section, a fold axis portion, a hinge end, a rotational axis, etc.) 308. In this example, the wing tip 302 exhibits a raked shape or curvature that extends along its respective lateral and vertical lengths.

In some examples, a ratio of a height of the wing tip 302 to a semi-span of the wing tip 302 is between approximately 0.2 to 0.5. Additionally or alternatively, an aspect ratio of the winglet 304 ranges from approximately 1.0 to 4.0.

FIG. 3B depicts the example raked foldable wing tip 312 in top and frontal views. The example wing tip 312 includes a winglet (e.g., an up-down winglet) 314, a base portion 316 and a hinge 318. In contrast to the winglet 304 of FIG. 3A, the winglet 314 of the illustrated extends along both upward and downward directions (in the frontal view of FIG. 3B) from top and bottom surfaces 315, 317, respectively, of the wing 110. In particular, the winglet 314 includes an upper portion 320 and a lower portion 321.

In some examples, a ratio of a height of the wing tip 312 to a semi-span of the wing tip 312 is between approximately 0.3 to 0.7. Additionally or alternatively, an aspect ratio of the winglet 314 ranges from approximately 1.0 to 6.0.

Turning to FIG. 3C, the example raked foldable wing tip 322 is shown having a winglet 324, a base portion 326 and a hinge 328. In this example, the winglet 324 extends both upwardly and downwardly from the wing 110, but is positioned inboard from a distal end 329 of the wing tip 322, in contrast to the winglet 314 of FIG. 3B. Accordingly, the winglet 324 of the illustrated example includes an upper portion 330 and a lower portion 332.

In some examples, a semi-spanwise location of the winglet 324 along the wing tip 322 is in a range of approximately between 0.5 to 0.9 of a semi-span of the wing tip 322.

FIGS. 4A-4C depict folding of the example wing tips 302, 312, 322 of FIGS. 3A-3C, respectively. Turning to FIG. 4A, a frontal view of the wing tip 302 in folded and unfolded states is shown. In this example, the example wing tip 302 is depicted rotated about the hinge 308 from a fixed portion (e.g., a stationary portion) 401 of the wing 110 of FIG. 1, as generally indicated by an arrow 402. In this example, the wing tip 302 along with the winglet 304 has been rotated to be within a span limit 404, which represents a wing span limit (e.g., a width limit) of the aircraft 100 shown in FIG. 1. In particular, the wing tip 302 is rotated from an unfolded angle (e.g., a deployed angle) to approximately 90 degrees from ground (as viewed in FIG. 4A).

Turning to FIG. 4B, the example wing tip 312 is shown along a frontal view in folded and unfolded states. As can be seen in the illustrated example of FIG. 4B, the wing tip 312 is rotated about the hinge 318 relative to the fixed portion 401, as generally indicated by an arrow 410. In particular, the wing tip 312 is rotated at an angle greater than 90 degrees so that the lower portion 321 of the winglet 314 is positioned within the span limit 404. In this example, the wing tip 312 is rotated to an angle greater than 90 degrees from ground (as viewed in FIG. 4B) and/or the fixed portion 401.

FIG. 4C depicts the example wing tip 322 along a frontal view in folded and unfolded states. Similar to the example of FIG. 4B, the lower portion 332 of the winglet 324 is rotated about the hinge 328 relative to the stationary portion 401, as generally indicated by an arrow 414, so that the lower portion 332 remains within the span limit 404.

FIGS. 5A-5B depict further example raked foldable wing tips 502, 512 in accordance with teachings of this disclosure. The example wing tips 502, 512 can be used to implement the wing tip 114 of FIG. 1. In contrast to the example wing tips 302, 312, 322 shown and described in connection with FIGS. 3A-4C, the example wing tips 502, 512, instead, implement wing tip feather aerodynamic devices that extend along forward and aft directions of the wing 110. Turning to FIG. 5A, the example wing tip 502 is shown in both top and frontal views (shown together for clarity). According to the illustrated example, the wing tip 502 includes feather 504 (hereinafter feathers 504a, 504b), a base portion 506, a hinge 508 and a distal end 510. In this particular example, the feather 504a extends relatively vertical to ground (e.g., 90 degrees from ground) (in the view of FIG. 5A).

In some examples, a tip feather joint location ranges from approximately 0.2 to 0.7 of a semi-span of the wing tip 502 (e.g. outboard from a root of the wing tip 502). In some examples that include a forward feather and an aft feather, a forward feather semi-span length divided by an aft feather semi-span length is equal to a range between approximately 0.8 to 1.2 (e.g., 1.0). In some examples, at least one of the feathers 504a, 504b has an aspect ratio between approximately 2.0 to 5.0. In some other examples, the feathers 504a, 504b are not positioned on the wing tip 502 (e.g., the wingtips 504a, 504b are positioned inboard from the wing tip 502).

FIG. 5B depicts the example wing tip 512 in both frontal and top views and shown in both folded and unfolded states. According to the illustrated example, the wing tip 512 includes feathers 514 (hereinafter feathers 514a, 514b), a base portion 516, a hinge 518 and a distal end 520. In contrast to the example wing tip 502 of FIG. 5A, the feather 514a is canted (e.g., exhibiting curvature in multiple planes), as opposed to the relatively vertically aligned feather 504a.

In operation, the wing tip 512 is rotated about the hinge 518. To enable the distal end 520 and the base portion 516 to be within the span limit 404, the wing tip 512 is sufficiently rotated (e.g., to an angular displacement of at least 90 degrees), as generally indicated by an arrow 530, when the aircraft 100 is on the ground, for example.

In some examples, a cant angle of a forward feather ranges from between approximately 25 to 90 degrees from an aft feather. In some examples, the forward feather is positioned higher (from ground) than the aft feather. Additionally or alternatively, the forward feather has a taller height than the aft feather. In some examples, a tip fold location coincides with an increase and/or a transition (e.g., an inflection, a slope change, etc.) in leading edge sweep. In some examples, feather geometry is integrated with winglet geometry (e.g., feathers are incorporated onto winglet and/or winglet shapes). In some other examples, the feathers 514a, 514b are not positioned on the wing tip 512.

The aforementioned example ranges and other ranges disclosed herein with respect to FIGS. 2-5B can be advantageous in aerodynamic efficiency (e.g., drag reduction) in folded wing tip applications, for example. However, while numerous example dimensions and parameter values have been described with respect to FIGS. 2-5B, any appropriate dimensions and/or parameter values can be implemented instead.

Figure 6:
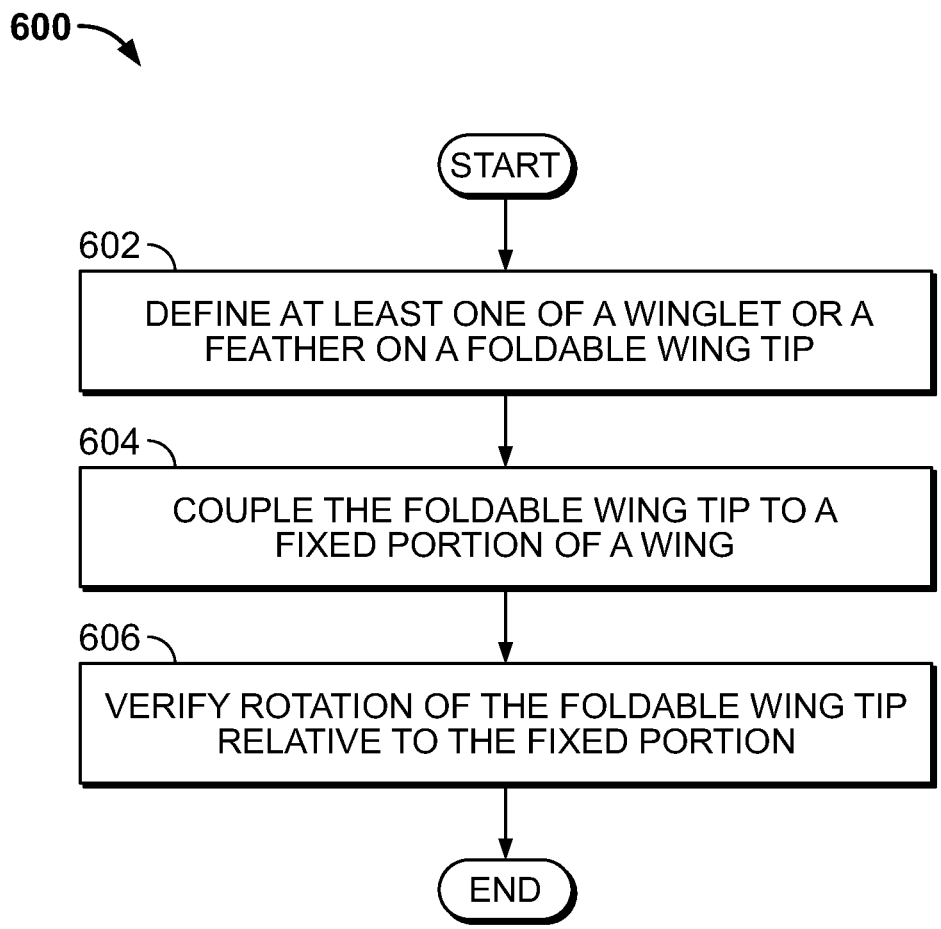
FIG. 6 is a flowchart representative of an example method to implement examples disclosed herein.

FIG. 6 is a flowchart representative of an example method 600 to implement examples disclosed herein. The example method 600 can be used to install a raked foldable wing tip or folding portion(s) (e.g., the wing tips 302, 312, 322, 502, 512) onto an aircraft being manufactured or an in-service aircraft (e.g., during a retrofit and/or upgrade process).

According to the illustrated example, at least one of a winglet or a feather is defined onto the foldable raked wing tip (block 602). In some examples, the winglet or the feather is integrally produced (e.g., die-cast, molded, etc.) on the wing tip. In other examples, the winglet or the feather is installed or assembled to the wing tip.

In this example, at block 604, the foldable wing tip is coupled to a fixed portion of a wing. In particular, the foldable wing tip is assembled to a hinge that defines an interface between the fixed portion and the foldable raked wing tip.

At block 606, in some examples, rotation of the foldable wing tip is verified and the process ends. For example, a rotational range of the foldable wing tip is verified to ensure that aerodynamic performance requirements are met and/or span requirements are met when the foldable wing tip is folded (e.g., folded upward).

Example 1 includes a wing for use with an aircraft. The wing includes a fixed portion, and a folding portion proximate a distal end of the wing. The folding portion includes a raked surface. The wing also includes at least one of a feather or a winglet, and a hinge operatively coupled between the fixed and folding portions to enable the folding portion to fold relative to the fixed portion.

Example 2 includes the wing of Example 1, where the folding portion includes the winglet.

Example 3 includes the wing of Example 2, where the folding portion further includes the feather.

Example 4 includes the wing of Example 3, where the folding portion rotates to an angular displacement greater than 90 degrees from the fixed portion.

Example 5 includes the wing of Example 2, where the folding portion further includes the feather.

Example 6 includes the wing of Example 2, where the winglet includes a height between approximately 0.2 to 0.9 of a semi-span of the folding portion.

Example 7 includes the wing of Example 2, where the winglet includes an aspect ratio between approximately 1.0 to 6.0.

Example 8 includes the wing of Example 1, where the folding portion has an aspect ratio between approximately 1.4 to 2.5.

Example 9 includes an aerodynamic structure of an aircraft. The aerodynamic structure includes a fixed portion including a first raked portion, and a folding portion with a second raked portion, and at least one of a winglet or a feather. The aerodynamic structure also includes a hinge operatively coupling the fixed and foldable portions to enable the foldable portion to rotate relative to the fixed portion.

Example 10 includes the aerodynamic structure of Example 9, where the folding portion includes the winglet.

Example 11 includes the aerodynamic structure of Example 10, where the winglet extends past bottom and top surfaces of the wing.

Example 12 includes the aerodynamic structure of Example 11, where the folding portion rotates to an angular displacement greater than 90 degrees from the fixed portion.

Example 13 includes the aerodynamic structure of Example 10, where the folding portion further includes the feather.

Example 14 includes the aerodynamic structure of Example 10, where the winglet includes a height between approximately 0.2 to 0.9 of a semi-span of the folding portion.

Example 15 includes the aerodynamic structure of Example 9, where the folding portion includes the feather, and where the feather has a joint location that is from approximately between 0.2 to 0.7 of a semi-span of the folding portion.

Example 16 includes a folding wing tip to be rotated relative to a fixed portion of a wing. The folding wing tip includes a raked portion extending along a lateral length of the folding wing tip, at least one of a winglet or a feather, and a hinge portion to be coupled to a hinge, where the hinge is to rotationally couple the folding wing tip to the fixed portion.

Example 17 includes the folding wing tip of Example 16, where the raked portion and the at least one of the winglet or the feather are overlapping.

Example 18 includes the folding wing tip of Example 16, where the folding wing tip includes the winglet with a height between approximately 0.2 to 0.9 of a semi-span of the folding wing tip.

Example 19 includes the folding wing tip of Example 16, where the folding wing tip has an aspect ratio between approximately 1.4 to 2.5.

Example 20 includes the folding wing tip of Example 16, where the folding wing tip includes the feather, and where the feather has a joint location that is from approximately between 0.2 to 0.7 of a semi-span of the folding wing tip.

Example 21 includes an example method that includes coupling a folding portion proximate to a distal portion of a wing, where the folding portion includes a raked surface, and where at least one of the folding portion includes a winglet or at least one of the wing or the folding portion includes a feather.

Example 22 includes the method of Example 21, and further includes defining at least one of the winglet or the feather onto the folding portion.

Example 23 includes the method of Example 21, where coupling the folding portion proximate to the distal portion of the wing includes coupling the folding portion to a hinge.

From the foregoing, it will be appreciated that example methods, apparatus and articles of manufacture have been disclosed that improve aerodynamic efficiency of foldable wing tips without need for additional complex and expensive moving parts and/or control systems. Accordingly, disclosed examples enable cost-effective improvement of aerodynamic efficiency. Further, some examples disclosed herein can enable increasing of wingspans (e.g., higher span wing designs for greater aerodynamic benefits).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown related to folding wing tips of aircraft, examples disclosed herein can be applied to any appropriate vehicle structure and/or application including, but not limited to, submersible applications, boating applications, vehicular applications, etc.

What is claimed is:

1. A wing for use with an aircraft, the wing comprising:
   a fixed portion;
   a folding portion proximate a distal end of the wing, the folding portion including a raked surface;
   at least one of a feather or a winglet; and
   a hinge operatively coupled between the fixed and folding portions to enable the folding portion to fold relative to the fixed portion between a folded position and an unfolded position, the at least one of the feather or the winglet to extend past a bottom surface of the wing and a top surface of the wing in the unfolded position.

2. The wing as defined in claim 1, wherein the folding portion includes the winglet.

3. The wing as defined in claim 2, wherein the folding portion further includes the feather.

4. The wing as defined in claim 2, wherein the winglet includes a height between approximately 0.2 to 0.9 of a semi-span of the folding portion.

5. The wing as defined in claim 2, wherein the winglet includes an aspect ratio between approximately 1.0 to 6.0.

6. The wing as defined in claim 1, wherein the folding portion rotates to an angular displacement greater than 90 degrees from the fixed portion.

7. The wing as defined in claim 1, wherein the folding portion has an aspect ratio between approximately 1.4 to 2.5.

8. The wing as defined in claim 1, wherein, in the folded position, an entirety of the at least one of the feather or the winglet is positioned on a side of the hinge that is closer to a fuselage of the aircraft.

9. An aerodynamic structure of an aircraft, the aerodynamic structure comprising:
   a fixed portion including a first raked portion;
   a folding portion including:
      a second raked portion, and
      at least one of a winglet or a feather; and
   a hinge operatively coupling the fixed and foldable portions to enable the foldable portion to rotate relative to the fixed portion between a folded position and an unfolded position, the at least one of the winglet or the feather to extend past a bottom surface of the wing and past a top surface of the wing in the unfolded position.

10. The aerodynamic structure as defined in claim 9, wherein the folding portion includes the winglet.

11. The aerodynamic structure as defined in claim 10, wherein the folding portion further includes the feather.

12. The aerodynamic structure as defined in claim 10, wherein the winglet includes a height between approximately 0.2 to 0.9 of a semi-span of the folding portion.

13. The aerodynamic structure as defined in claim 9, wherein the folding portion rotates to an angular displacement greater than 90 degrees from the fixed portion.

14. The aerodynamic structure as defined in claim 9, wherein the folding portion includes the feather, and wherein the feather has a joint location that is from approximately between 0.2 to 0.7 of a semi-span of the folding portion.

15. A folding wing tip to be rotated relative to a fixed portion of a wing, the folding wing tip comprising:
  a raked portion extending along a lateral length of the folding wing tip;
  at least one of a winglet or a feather; and
  a hinge portion to be coupled to a hinge, the hinge to rotationally couple the folding wing tip to the fixed portion, the folding wing tip to move between a folded position and an unfolded position at the hinge portion, the at least one of the winglet or the feather to extend past a bottom surface of the wing and past a top surface of the wing in the unfolded position.

16. The folding wing tip as defined in claim 15, wherein the raked portion and the at least one of the winglet or the feather are overlapping.

17. The folding wing tip as defined in claim 15, wherein the folding wing tip includes the winglet with a height between approximately 0.2 to 0.9 of a semi-span of the folding wing tip.

18. The folding wing tip as defined in claim 15, wherein the folding wing tip has an aspect ratio between approximately 1.4 to 2.5.

19. The folding wing tip as defined in claim 15, wherein the folding wing tip includes the feather, and wherein the feather has a joint location that is from approximately between 0.2 to 0.7 of a semi-span of the folding wing tip.

20. A method comprising:
  coupling a folding portion proximate to a distal portion of a wing, wherein the folding portion includes a raked surface, and wherein at least one of:
    the folding portion includes a winglet, or
    at least one of the wing or the folding portion includes a feather,
  wherein the folding portion is to move between a folded position and an unfolded position, at least one of the winglet or the feather to extend past a bottom surface of the wing and past a top surface of the wing in the unfolded position.

21. The method as defined in claim 20, further including defining at least one of the winglet or the feather onto the folding portion.

22. The method as defined in claim 20, wherein coupling the folding portion proximate to the distal portion of the wing includes coupling the folding portion to a hinge.

\* \* \* \* \*